Sept. 11, 1934.   N. S. YOST   1,972,966
ELECTRIC MOTOR
Filed June 25, 1932
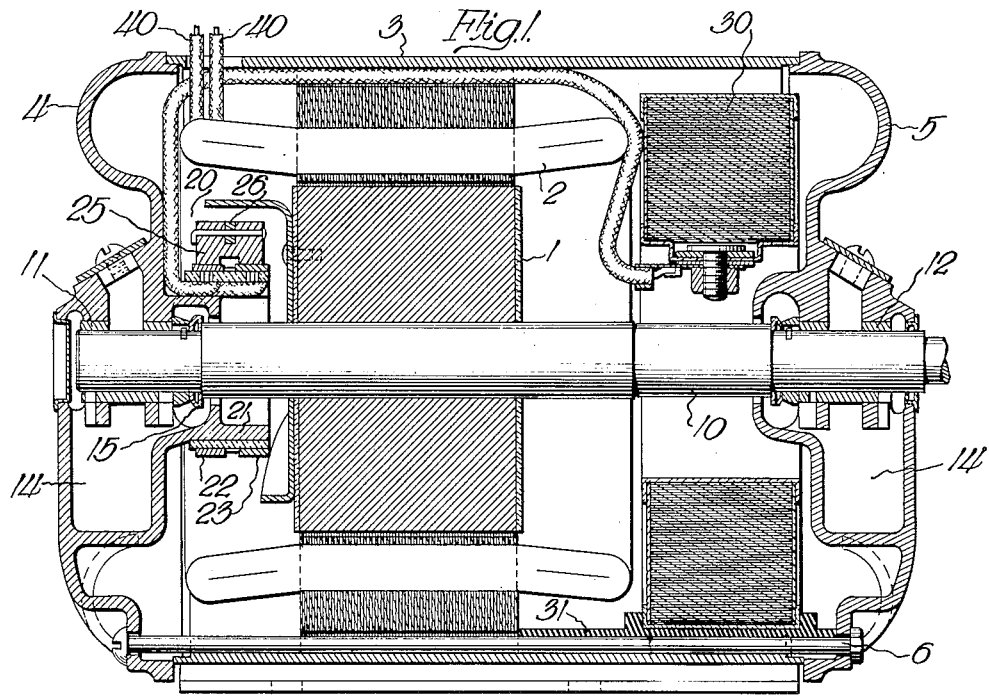
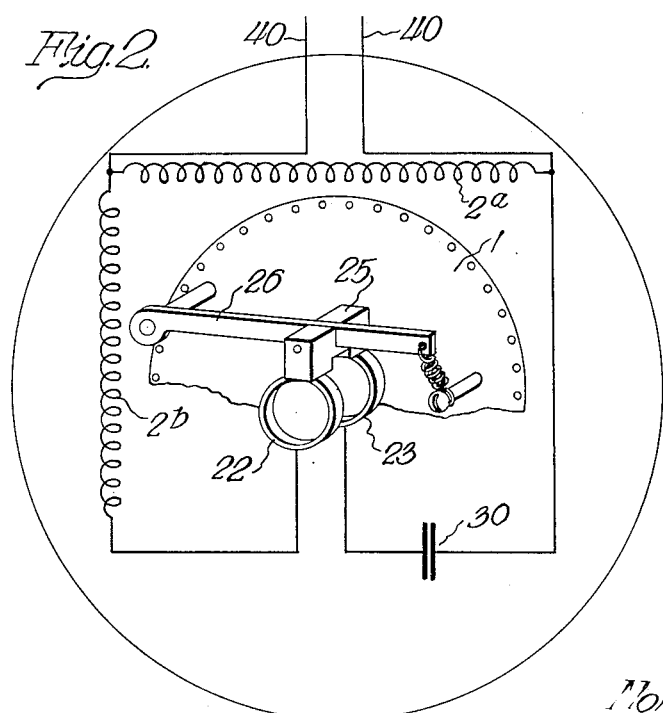
Inventor:
Norman S. Yost
By Brown Jackson Boettcher Dienner
Att'ys.

Patented Sept. 11, 1934

1,972,966

UNITED STATES PATENT OFFICE 1,972,966

ELECTRIC MOTOR

Norman S. Yost, Howell, Mich., assignor to Howell Electric Motors Company, Howell, Mich., a corporation of Michigan Application June 25, 1932, Serial No. 619,187

6 Claims. (Cl. 172—279)

The present invention relates to alternating current motors and more particularly to single phase self-starting induction motors wherein the stator winding comprises two parts, with a condenser connected to one of the parts for providing the phase displacement necessary to produce a high starting torque. Such a motor is shown in my Patent No. 1,828,724, of October 20, 1931.

The motor of the present invention, although of general application, is particularly adapted for operating the compressors of electric refrigerators. In such apparatus the motor must be capable of starting under a heavy load. After the motor has started, one winding is sufficient for efficient operation, and a switch therefore operates to cut out the starting winding and the condenser. It is desirable, in apparatus of this class, to have as compact an arrangement as possible, with as few external parts as possible. It is one of the objects of the present invention to provide a motor of the above type wherein the condenser is built into the motor casing itself. It is a further object of the present invention to provide such a motor wherein the switch is also mounted within the motor casing so that all of the wiring between the condenser, the switch, and the starting winding is within the motor casing itself and therefore no external wiring is required before the motor can be operatively connected across a power line. I propose to make the condenser of a generally annular form and mount the same in a position surrounding the rotor shaft. Such a condenser may be built into the motor casing without substantially increasing the size thereof and without interfering with the conduction of heat from the motor winding. The cooling of the condenser is facilitated by the natural movement of air through the center thereof under the action of the rotor. This provides for adequate cooling of the inner portion of the condenser, while the outer portion is adequately cooled due to its proximity to the periphery of the motor casing.

The attainment of the above and further objects of the present invention will be apparent from the following specification, taken in conjunction with the accompanying drawing forming a part thereof.

In the drawing:

Figure 1 is a longitudinal section through my improved motor; and

Figure 2 is a simplified sketch of the connections involved.

Reference may now be had more particularly to Figure 1 of the drawing. The motor comprises an induction rotor 1 and a wound stator 2, both of the usual construction, and both enclosed in a casing comprising a cylindrical shell or barrel 3 and end closure members 4 and 5 clamped thereto by a plurality of bolts 6 extending between the end members at the periphery thereof. The stator is of the usual laminated construction and carries two separate windings of which more will be said as this description proceeds. The laminae are of a generally square shape with the corners cut away along a curve to fit them into the shell 3. The corners of a 5¼" square may be cut away to fit the same into a cylinder 5¾" internal diameter. This leaves a maximum space of about one fourth of an inch between the center of the edge of the lamination and the inside of the shell. Through this space is passed the conductors that extend the circuit between a condenser, mounted at one end of the motor casing, and a switch mounted at the other end. It is to be understood that the above dimensions are given by way of illustration, rather than limitation. The rotor is provided with the usual rotor shaft 10 journaled in bearings 11 and 12 in the end members 4 and 5, respectively. Bearing lubricating means are provided, comprising oil wells 14—14 adapted to contain oil, into which is adapted to dip the usual form of oiling rings or the like, carried at the end of the shaft 10. The usual form of oil throw ring 15 is provided for throwing outwardly, by centrifugal force, any oil that may creep along the end of the shaft at the bearings.

A centrifugal switch 20, of any approved construction, is mounted within the motor casing. The stationary portion of this switch is mounted on an inwardly projecting circular extension 21 formed on the end closure member 4. A pair of slip rings 22—23 are mounted on, but insulated from, the portion 21 and constitute the two terminals of the switch 20. The two slip rings are adapted to be electrically connected together by a brush 25 carried on an arm 26 that is pivoted to the rotor and spring biased to the closed position. The brush 25 establishes contact between the slip rings when the motor is at rest, and is swung out of engagement with the slip rings, by centrifugal force, as the motor approaches its running speed.

A condenser 30 is mounted within the motor casing adjacent the end closure member 5 and is connected in series with one of the two stator windings by the centrifugal switch 20. The condenser 30 is of an annular or ring shape and is preferably of the electrolytic type. The condenser may be mounted in the motor casing in any preferred manner. As illustrated in Figure 1, the condenser is placed in an annular container, preferably of aluminum, and held in place by four rubber grommets 31 spaced along the periphery of the shell 3. The bolts 6 that clamp the end members 4 and 5 to the cylindrical shell or barrel 3 pass through holes formed in the members 31. It is, however, to be understood that the condenser may be mounted in place in any other particularly preferred manner. It is to be noted that the inner periphery of the condenser ring may be cooled by the natural circulation of air under the action of the rotor. This, therefore, prevents the formation of localized hot-spots at the inner portion of the condenser. The outer periphery of the condenser is adjacent the motor casing and is thereby readily cooled.

As previously stated, the condenser is preferably of the electrolytic type. While any desired electrolyte may be used, I prefer one of the following composition:

Glycol _____ 400 cubic centimeters
Borax _____ 25.6 oz.
Boric acid _____ 17.0 oz.
Water _____ 25.6 oz.

When boiled together, these ingredients make a compound of glycol sodium acid borate, of the consistency of fairly thick paste, or thick molasses.

The condenser comprises strips of aluminum covered with a film of oxide and separated by layers of cloth that are thoroughly impregnated with the above compound, and wound into an annular form. This unit is then placed in a metal container for mounting within the motor. The metal container is provided with a vent. If desired, the metal container may be dispensed with and the unit completed by first wrapping the outside thereof with friction tape, then with plain linen tape, and then dipping the same in a high fusion point wax, such as an asphalt base wax. Such a unit permits a limited escape of gases that may be produced within the condenser by electrolytic action.

In Figure 2 I have indicated, diagrammatically, the circuit connections of the motor of my present invention. The stator 2 of Figure 1 comprises two sections, as previously stated, said sections being indicated at 2a and 2b. The winding 2a comprises the running winding of the motor, while the winding 2b comprises the starting winding. When the motor is at rest the centrifugal switch 20 is closed, thereby connecting the starting winding across the line terminals in series with the condenser 30. This provides the phase displacement necessary for producing the starting torque. When the motor attains a sufficient speed the centrifugal switch opens, thereby disconnecting the condenser and the winding 2b from the circuit. All of the connections between the condenser, the switch, and the starting winding of the stator are within the motor. Only two leads, indicated at 40, extend outwardly from the motor casing. Those leads are adapted to be connected to an alternating current power line in the usual manner.

As previously stated, the present motor is particularly adapted for operating compressors of refrigerating machines. As such, it is necessary that the motor have a high starting torque. The windings 2a and 2b are designed to produce such high starting torque. Once the motor has started, the demand on the motor is appreciably reduced and therefore the winding 2a is sufficient for operating purposes. Since the condenser is subject to only intermittent loading it is possible to use an electrolytic condenser of large current carrying capacity for small intervals of time. Although the condenser is heated at a comparatively high rate during the starting operation, the duration of this period is rather small, hence the condenser is not overheated. It is therefore possible to use a comparatively small condenser, which may be mounted within the motor casing, without appreciably increasing the size thereof. Since the total amount of heat produced by the condenser is small, the condenser does not adversely affect the heating of the motor.

While I have herein shown a centrifugal switch for effecting the switching operation, it is not essential that this switch be centrifugally operated. It is within the purview of the present invention to use any switch that is operated upon the occurrence of the conditions prevailing after the motor has started. For instance, such a switch may be electromagnetic and operated in accordance with the counter E. M. F. of the motor, or in accordance with the decline in the current taken by the motor. Likewise, insofar as concerns the condenser, while it is preferred to mount the same within the motor casing, it is within the purview of the present invention to mount it as an enclosed unit on the outside of one of the end members 4—5, whereby the condenser unit and the motor still comprise one integral structure.

In compliance with the requirements of the patent statutes I have herein shown and described a preferred embodiment of my invention. It is, however, to be understood that the invention is not limited to the precise construction herein set forth, the same being merely illustrative of the principles of the invention.

What I consider new and desire to secure by Letters Patent is:

1. A single phase alternating current motor comprising a cylindrical casing having an end closure member, a stator within the casing and spaced from the end closure member, a rotor within the casing, an annular condenser surrounding the rotor shaft and located between the end closure and the stator but spaced from the stator to permit circulation of air between the stator and the condenser, said condenser extending to substantially the inner periphery of the casing, and means separate from the end closure member for supporting the condenser in the casing.

2. A single phase alternating current motor comprising a casing having a pair of end closure members, a stator including a main winding and an auxiliary winding, a rotor, a condenser connected in the circuit with auxiliary winding, said condenser being of annular shape and surrounding the rotor shaft and located between one of the end closure members and the stator and separate from the end closure members, bolt means extending between the end closure members for holding said members in place, and means including said bolt means for holding the condenser in place.

3. A motor structure including a cylindrical casing, end closure members for said casing, a rotor shaft extending centrally through said casing, means for securing said end closure members in fixed position to said casing, a rotor on said rotor shaft, a stator surrounding said rotor and spaced from the inner wall of said casing, a centrifugally operated switch supported on one of said closure members within the peripheral limits of said casing, an annular condenser member spaced from said stator and surrounding the rotor shaft adjacent the other closure member, means carried by said securing means for supporting said condenser in spaced relationship to said stator within the peripheral limits of said casing, and conductor means within said casing between said stator, switch and condenser.

4. In a single phase alternating current motor, a cylindrical motor casing, end closure means therefor, a rotor shaft in said casing, a wound stator surrounding said shaft, means for securing said end closure members to the defining ends of said casing, an annular starting condenser surrounding said rotor shaft and spaced from said stator within the peripheral limits of said casing, and independent supporting means about the inner wall of said casing and engaging the outer periphery of said condenser.

5. In combination, in a single phase motor adapted to start under load, a motor housing having a central substantially cylindrical shell and end frames, a stator mounted in the housing, windings for said stator, a rotor having a shaft provided with bearings in said end frames, an electrolytic condenser adapted to cooperate with said windings to provide a split phase effect during starting only, said condenser being disposed within the housing, said condenser comprising an electrolytic element comprising a pair of metallic ribbons with separating strips wound in spiral form into an annular body impregnated with a suitable electrolyte, and an annular shell within which said electrolytic element is enclosed, said rotor shaft extending through the opening in the annular shell, and means for supporting said condenser substantially concentrically within the housing.

6. In a single phase motor adapted to start under load, a substantially cylindrical housing comprising end plates having bearings, a stator mounted in said housing, windings for the stator, a rotor having a shaft supported in said bearings, an electrolytic condenser and a switch adapted to cooperate with said windings to provide a split phase effect for starting only, said condenser being disposed within the housing, said condenser comprising metallic ribbons with separating strips wound spirally into an annular body and being impregnated with a suitable electrolyte, an annular aluminum shell substantially rectangular in cross section enclosing said body, and insulating means disposed about the periphery of the aluminum shell for supporting the same radially and axially out of electrical contact with the motor housing and said shaft, said rotor shaft projecting through the central opening of said annular shell.

NORMAN S. YOST.